April 27, 1948.    H. M. MARTIN    2,440,551
DYNAMOELECTRIC MACHINE WITH COOLING MEANS
Filed Sept. 29, 1943
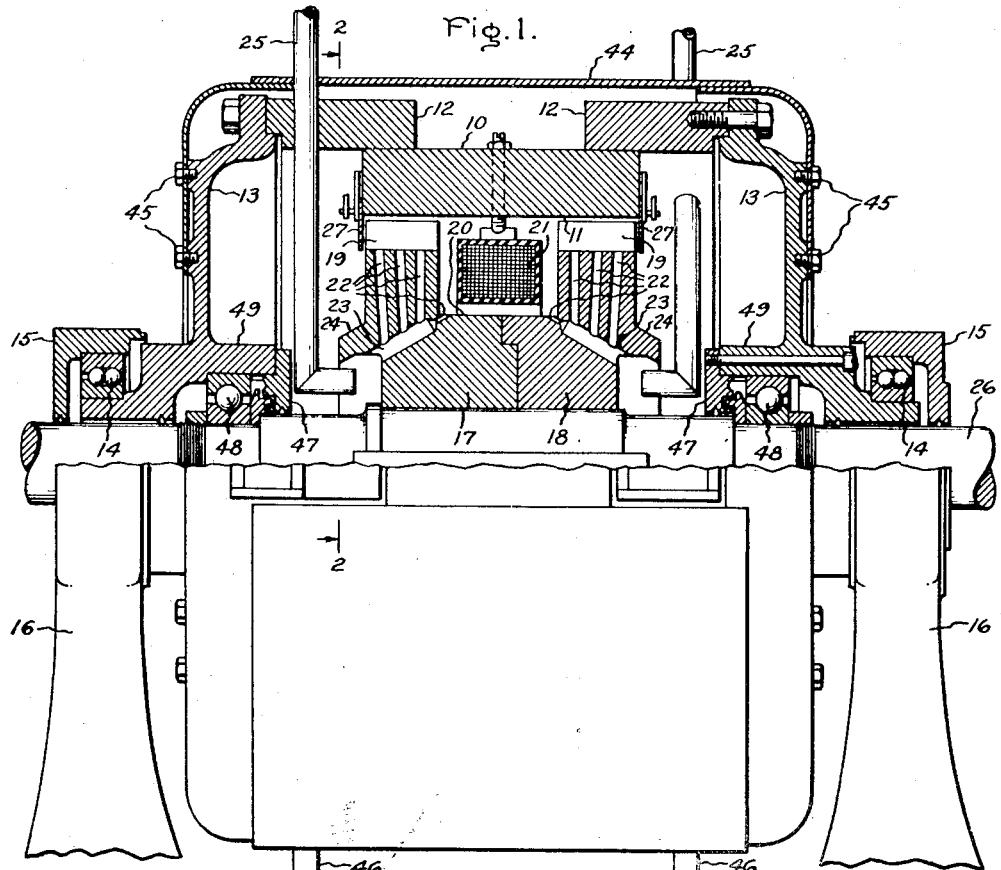
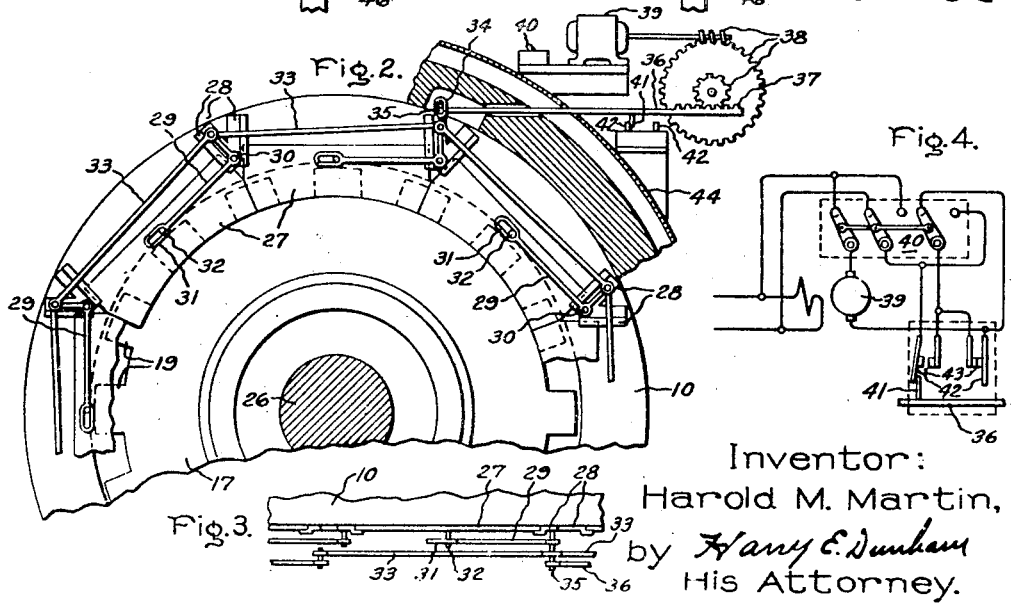
Inventor:
Harold M. Martin,
by Harry E. Dunham
His Attorney.

Patented Apr. 27, 1948

2,440,551

UNITED STATES PATENT OFFICE 2,440,551

DYNAMOELECTRIC MACHINE WITH COOLING MEANS

Harold M. Martin, Schenectady, N. Y., assignor to General Electric Company, a corporation of New York Application September 29, 1943, Serial No. 504,273

10 Claims. (Cl. 188—104)

This application relates to dynamoelectric machines and particularly to inductor eddy current dynamometers.

An object of my invention is to provide an improved dynamoelectric machine utilizing a cooling liquid in the air gap between the relatively rotatable members and having an arrangement for controlling the flow of this cooling liquid.

Another object of my invention is to provide an improved dynamoelectric machine adapted to be cooled by liquid in the air gap between the relatively rotatable members of the machine and having movable shutters for controlling the flow of cooling liquid through the air gap.

Further objects and advantages of my invention will become apparent and my invention will be better understood from the following description referring to the accompanying drawing, and the features of novelty which characterize my invention will be pointed out with particularity in the claims annexed to and forming part of this specification.

In the drawing, Fig. 1 is a side elevational view, partly in section, of a dynamoelectric machine provided with an embodiment of my invention; Fig. 2 is a partial end view taken along line 2—2 of Fig. 1; Fig. 3 is a partial plan view showing the relative arrangement of the shutters and control levers shown in Figs. 1 and 2; and Fig. 4 is a schematic diagram of a motor and its control circuit for operating the shutters used in this embodiment of my invention.

Referring to the drawing, I have shown a dynamoelectric machine of the inductor eddy current type adapted to be used as a dynamometer and provided with an embodiment of my improved cooling arrangement. In this construction, the machine is provided with a pair of relatively rotatable members, one of which includes an annular member 10 of magnetic material having a relatively smooth inner surface 11 and arranged to be supported by a pair of end rings 12 mounted on end shields 13 which are supported by bearings 14 mounted in bearing housings 15 formed in pedestals 16. The other relatively rotatable member is formed of two sections 17 and 18 of magnetic material, each of which is provided with teeth 19 and an intermediate portion 20 of reduced diameter. An exciting winding 21 is supported by a plurality of set screws and is arranged about the reduced diameter portion 20. Energization of the exciting winding 21 produces a magnetic excitation of the magnetic members 10, 17 and 18, and rotation of the teeth 19 adjacent the smooth surface 11 induces eddy currents in the member 10, which may cause a considerable rise in the temperature of the member 10. It is desirable that this heat be dissipated in order to maintain efficient operation of the machine. In order to cool the member 10, the relatively rotatable toothed member is provided with a plurality of outwardly extending cooling fluid passages 22 which communicate with distributing passages 23 formed in the elements 17 and 18 and into which cooling liquid is adapted to be supplied from a trough formed by an annular flange 24. Cooling liquid is supplied to this trough by cooling liquid supply tubes 25, and the liquid is adapted to pass from the trough formed by the flange 24 into the distributing passage 23 and outwardly through the passages 22 into the slots between the teeth 19 under the action of centrifugal force when the toothed member is coupled through its shaft 26 to a driving source of power which is to be tested. The passage of water in the air gap between the teeth 19 and the smooth surface 11 of the member 10 and between the teeth 19 tends to cool the member 10 and also creates a hydraulic load on the machine due to the turbulence of the cooling liquid in these spaces.

In order to use the cooling liquid efficiently and in order to control the hydraulic load on the machine, I arrange a plurality of movable shutter members 27 which are slidably mounted between guides 28 secured to the outer ends of the member 10 adjacent the air gap between the two relatively rotatable members of the machine. Each of these shutter members 27 is adapted to be actuated by a linkage which includes a crank arm 29 pivotally mounted on a pivot pin 30 on the member 10 and having a lost-motion end connection 31 with an actuating pin 32 secured to each shutter member 27. The other end of the crank 29 is pivotally secured to an operating link 33 and all of the actuating links 33 are pivotally secured together and to a lost-motion connection 34 which is adapted to be actuated by a drive pin 35 mounted on an operating rod 36. The operating rod is connected through a gear rack 37 and reduction gearing 38 to an electric drive motor 39, the armature of which is connected in series with a reversing switch 40 which is adapted to be operated manually in order to energize the motor 39 for operation in opposite directions. The operating rod 36 is provided with a switch operating finger 41 which is adapted to engage circuit breaker operating fingers 42 for opening the motor circuit when the operating load 36 has moved the shutter members 27 to either of their predetermined full open or closed positions.

Referring to the circuit diagram in Fig. 4, if the shutter members are moved to either of their extreme positions, they are automatically stopped by reason of the opening of the motor circuit by the opening of the contacts 43 by the operating finger 41. Since the movement of the shutters is limited to a relatively small distance, the motor does not attain any large amount of momentum and, therefore, does not tend to overtravel when the switches 43 are opened. In order to assure against any tendency for the motor to overtravel, the switch operating fingers 42 may be placed at such a distance from each other relative to the operation of the crank arm 29 that they will open the circuit of the motor a short time before the shutter members 27 have reached their limiting positions. In this manner, the shutters 27 are adapted to control the annular depth of the cooling liquid between the relatively rotatable members, and thereby to control the hydraulic load on the machine. A casing 44 is mounted about the machine and is secured to the end shields 13 by screws 45, and drain pipes 46 are arranged at the bottom of the machine to drain off liquid from within the machine. Labyrinth seals 47 are arranged near each of the end shields 13 around the shaft 26 to prevent the passage of cooling liquid into bearings 48 which are mounted within bearing housings 49 formed on the end shields 13 and which support the shaft 26. The guiding and actuating arrangements for the shutters as well as the specific contours of these shutters can obviously be varied to provide different movements and different control of the shutters to give the desired result.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A dynamoelectric machine having a pair of relatively rotatable members, one of said members having a section with a relatively smooth surface and the other of said members having a toothed section with the teeth of said toothed section arranged adjacent said smooth surface and providing an air gap therebetween, means including an exciting winding for magnetically exciting said pair of relatively rotatable members, means for supplying cooling liquid into the air gap between said pair of relatively rotatable members, and means arranged in the exhaust flow path of the cooling liquid from said machine for variably controlling the exhaust flow of cooling liquid through the air gap between said relatively rotatable members.

2. A dynamoelectric machine having a pair of relatively rotatable members, one of said members having a section with a relatively smooth surface and the other of said members having two spaced apart toothed sections with an intermediate section of reduced diameter, the teeth of said toothed sections being arranged adjacent said smooth surface and providing an air gap therebetween, means including an exciting winding for magnetically exciting said pair of relatively rotatable members, means for supplying cooling liquid into the air gap between said pair of relatively rotatable members, and means arranged in the exhaust flow path of the cooling liquid from said machine for variably controlling the exhaust flow of cooling liquid through the air gap between said relatively rotatable members.

3. A dynamoelectric machine having a pair of relatively rotatable members, one of said members having a section with a relatively smooth surface and the other of said members having two spaced apart toothed sections with an intermediate section of reduced diameter, the teeth of said toothed sections being arranged adjacent said smooth surface and providing an air gap therebetween, means for magnetically exciting said pair of relatively rotatable members, means for supplying cooling liquid into the air gap between said pair of relatively rotatable members, and means including a plurality of movable shutter members arranged adjacent the outer axial ends of said air gap and of the slots between said teeth for controlling the flow of cooling liquid between said relatively rotatable members.

4. A dynamoelectric machine having a pair of relatively rotatable members, one of said members having a section with a relatively smooth surface and the other of said members having a toothed section with the teeth of said toothed section arranged adjacent said smooth surface and providing an air gap therebetween, means for magnetically exciting said pair of relatively rotatable members, means for supplying cooling liquid into the air gap between said pair of relatively rotatable members, means including a plurality of movable shutter members arranged adjacent the outer end of said air gap and of the slots between said teeth for varying the flow of cooling liquid between said relatively rotatable members, and means for automatically limiting the movement of said shutter members to predetermined open and closed positions.

5. A dynamoelectric machine having a pair of relatively rotatable members, one of said members having a section with a relatively smooth surface and the other of said members having two spaced apart toothed sections with an intermediate section of reduced diameter, the teeth of said toothed sections being arranged adjacent said smooth surface and providing an air gap therebetween, means for magnetically exciting said pair of relatively rotatable members, means for supplying cooling liquid into the air gap between said pair of relatively rotatable members, means including a plurality of movable shutter members arranged adjacent the outer axial ends of said air gap and of the slots between said teeth, and means for moving said shutter members to relatively open and closed positions for varying the flow of cooling liquid between said relatively rotatable members.

6. A dynamoelectric machine having a pair of relatively rotatable members, one of said members having a relatively smooth surface and the other of said members having a toothed section with the teeth of said toothed section arranged adjacent said smooth surface and providing an air gap therebetween, means including an exciting winding for magnetically exciting said pair of relatively rotatable members, means for supplying cooling liquid into the air gap between said pair of relatively rotatable members, means including a plurality of movable shutter members arranged adjacent the outer end of said air gap and of the slots between said teeth, means for moving said shutter members to relatively open and closed positions for varying the flow of cooling liquid between said relatively rotatable members for controlling the cooling of said members and the hydraulic load thereon, and means for automatically limiting the movement of said shutter members to predetermined open and closed positions.

7. A dynamoelectric machine having a pair of relatively rotatable members, one of said members having a section of magnetic material with a relatively smooth surface and the other of said members being formed of magnetic material and having two axially spaced apart toothed sections with an intermediate section of reduced diameter, the teeth of said toothed sections being arranged adjacent said smooth surface and providing an air gap therebetween, means including an exciting winding arranged about said reduced diameter section for magnetically exciting said pair of relatively rotatable members, means for supplying cooling liquid into the air gap between said pair of relatively rotatable members, means including a plurality of movable shutter members arranged adjacent the outer axial ends of said air gap and of the slots between said teeth, means including an electric drive motor for moving said shutters to relatively open and closed positions for varying the flow of cooling liquid between said relatively rotatable members for controlling the cooling of said members, and means for automatically stopping said electric motor for limiting the movement of said shutters to predetermined open and closed positions.

8. A dynamoelectric machine having a pair of relatively rotatable members, one of said members having a section of magnetic material with a relatively smooth surface and the other of said members being formed of magnetic material and having two axially spaced apart toothed sections with an intermediate section of reduced diameter, the teeth of said toothed sections being arranged adjacent said smooth surface and providing an air gap therebetween, means including an exciting winding arranged about said reduced diameter section for magnetically exciting said pair of relatively rotatable members, means for supplying cooling liquid into the air gap between said pair of relatively rotatable members, means including a plurality of movable shutter members arranged adjacent the outer axial ends of said air gap and of the slots between said teeth, means for moving said shutter members to relatively open and closed positions for varying the flow of cooling liquid between said relatively rotatable members for controlling the cooling of said members and the hydraulic load thereon, and means for automatically limiting the movement of said shutter member to predetermined open and closed positions.

9. Eddy-current apparatus comprising a cylindric armature having an internal eddy-current surface, an annular field coil carried by said armature in a central plane, a rotary polar field member within said armature, means for introducing cooling liquid between the armature and field member at points on opposite sides of said field coil and relatively spaced, and means for abstracting said liquid from points on opposite sides of said field coil and also relatively spaced both with respect to each other and said points of entry of the liquid, said liquid being introduced through said field member.

10. Eddy-current apparatus comprising a cylindric armature having an internal eddy-current surface, an annular field coil carried by said armature in a central plane, a rotary polar field member within said armature, means for introducing cooling liquid through the field member and into position between the armature and field member at points on opposite sides of said field coil and relatively spaced, and means for abstracting said liquid from points on opposite sides of said field coil and also relatively spaced both with respect to each other and said points of entry of the liquid.

HAROLD M. MARTIN.

REFERENCES CITED

The following references are of record in the file of this patent:

UNITED STATES PATENTS

| Number | Name | Date |
| --- | --- | --- |
| 992,883 | Kewis | May 23, 1911 |
| 1,114,727 | Breeze | Oct. 27, 1914 |
| 1,607,288 | Laffoon | Nov. 16, 1926 |
| 1,691,696 | Baum | Nov. 13, 1928 |
| 1,779,797 | Baum | Oct. 28, 1930 |
| 2,188,398 | Bernard | Jan. 30, 1940 |
| 2,351,963 | Hayes | June 20, 1944 |